United States Patent
Nuebling

(10) Patent No.: US 7,318,552 B2
(45) Date of Patent: Jan. 15, 2008

(54) APPARATUS FOR READING CODES

(75) Inventor: Ralf Ulrich Nuebling, Denzlingen (DE)

(73) Assignee: Sick AG, Waldkirch (DE)

( * ) Notice: Subject to any disclaimer, the term of this patent is extended or adjusted under 35 U.S.C. 154(b) by 131 days.

(21) Appl. No.: 11/363,591

(22) Filed: Feb. 27, 2006

(65) Prior Publication Data

US 2006/0196943 A1    Sep. 7, 2006

(30) Foreign Application Priority Data

Mar. 1, 2005    (DE)    ...................... 10 2005 009 308

(51) Int. Cl.
*G06K 7/10* (2006.01)
(52) U.S. Cl. .................... 235/462.23; 235/462.22; 235/462.32; 235/454
(58) Field of Classification Search .......... 235/462.22, 235/462.23, 462.24, 462.32, 462.14
See application file for complete search history.

(56) References Cited

U.S. PATENT DOCUMENTS 5,252,816 A * 10/1993 Onimaru et al. ....... 235/462.36
5,616,909 A * 4/1997 Arackellian ............ 235/462.22
6,801,260 B1    10/2004 Veksland et al.

FOREIGN PATENT DOCUMENTS

WO    WO 93/14470 A1    7/1993

* cited by examiner

*Primary Examiner*—Seung Ho Lee
(74) *Attorney, Agent, or Firm*—Townsend and Townsend and Crew, LLP

(57) ABSTRACT

Apparatus for reading codes for capturing one- and/or two-dimensional codes located at varying distances. A light receiver is arranged in a housing that also includes a projection optics and a deflecting mirror located on the optical axis between the projection optics and the light receiver. The deflecting mirror is mounted on a pivot arm that is pivotable relative to the housing about a pivot axis for changing the projected image of the object by pivoting the pivot arm to effect positional and angular changes of the light receiver relative to the projecting optics. The light receiver is coupled to the pivot arm so that, upon pivoting of the pivot arm, the light-receiving surface of the light receiver changes its position and angular orientation.

15 Claims, 2 Drawing Sheets

APPARATUS FOR READING CODES

RELATED APPLICATIONS

This application claims priority under 25 USC Section 119 from German application No. 10 2005 009 308.6 filed Mar. 1, 2005.

BACKGROUND OF THE INVENTION

The present invention concerns an identification system, and in particular a code reader, for reading one- and/or two-dimensional codes that are arranged at different distances, that has a housing in which a position resolving light receiver and associated focusing optics are arranged.

Known identification systems project an image of a code onto an image plane via a projection optics. A position resolving light receiver is located in the image plane and has multiple light-receiving pixels arranged linearly or in matrix form.

The differing light contrasts of the code are reproduced by the projected image and cause varying photocurrents in the individual light-receiving pixels of the light receiver which can be used to generate signals which identify the content of the code.

Such coding systems have many applications. For example, they can be used to identify and/or control individual objects in transportation systems. The present invention is not limited to processing particular codes and applies to all types of information carriers which can be photoprocessed.

Efficient coding systems are expected to contain increasing amounts of information on coding surfaces that are as small as possible. This requires that the identification system have a high spatial resolution. Particularly high demands are placed on the coding system when position or location of the code can vary over a relatively large distance range. Efficient coding systems must further exhibit a high degree of readability, which requires, amongst others, efficient projection optics. These two requirements, that is, the ability to generate high quality images of objects that can be spaced apart over a wide range, and at the same time provide efficient projection optics, demand that the coding system be equipped with an automatic distance adjuster.

Known distance adjusting systems compensate for different object distances by adjusting what is commonly referred to as the back focal distance, which is the distance measured from the vortex of the last back surface of the last lens of the optics to the focal point (hereinafter usually referred to as the "back focal length") as a result of changing the distance between the projection optics and the position resolving light receiver in the image plane.

In such situations, it was customary to move the entire receiving optics along the optical axis, while the position resolving light receiver is stationarily mounted in a housing. This is usually attained by moving the projecting optics with a servo motor via a threaded spindle that is engaged by a threaded sleeve. Use of such an arrangement over a long period of time can subject the threaded drive to as many as about $10^7$ to $10^9$ operating cycles over its life. This subjects mechanical bearings and sliding surfaces to extensive wear and tear that can exceed the capability of such components. In addition, such distance adjusting systems operate relatively slowly, so that such systems are not well-suited for applications where a rapid response to changing code distances is required.

U.S. Pat. No. 6,801,260 discloses an arrangement in which a movable mirror is arranged between fixed projecting optics and a fixed light receiver. The mirror is moved either linearly or pivotally to change the distance to the projecting optics. This changes the back focal length so that the images on the position resolving light receiver of objects with different object distances are always sharp and clear.

When the mirror is moved linearly, the point where the optical axis strikes the light receiver changes. This is disadvantageous because for each distance setting the image of a different area or portion of the object strikes the center of the light receiver.

The problem of different object areas or portions at the center of the light receiver can be avoided by moving the adjustable mirror not only linearly but instead pivoting it while at the same time adjusting its distance from the projecting optics. In this manner, the optical axis, and therewith the same object area or portion, is always projected onto the center of the light receiver so that for different distance settings the same object portion is reproduced at the center of the light receiver.

A drawback of the system disclosed in U.S. Pat. No. 6,801,260 is that when the object distance varies, the quality of the projected image suffers. The reason for this is that when the mirror is pivoted, the optical axis of the receiving light beam no longer optimally strikes the position resolving light receiver. The requirement, often referred to as the "Scheinpflug-rule", concerning the proper orientation and alignment of the object, image and image plane over the range of possible distance settings, is no longer fulfilled. Consequently, projecting errors and distortions result, which lowers the quality of the image.

Such image projection errors reduce the position resolution of the coding system and are therefore undesirable.

SUMMARY OF THE INVENTION

It is an object of the present invention to provide a coding or identification system with an automatic distance adjuster that is capable of optimally identifying objects located at different distances and which is relatively inexpensive, reacts quickly to differences in the object distance, is not subject to wear, and corrects optical projection errors or distortions that may arise.

The present invention provides a coding system which has a position resolving light receiver and an associated projection optics arranged in a common housing. A deflecting mirror is placed between the projection optics and the light receiver. The mirror is mounted on a pivot arm that is pivotable about a fixed pivot axis in the housing. When the arm is pivoted, the resulting change in the position and angular orientation of the mirror changes the back focal length. In accordance with the present invention, the position resolving light receiver is coupled to the pivot arm so that, upon pivoting of the arm, a light-sensitive surface of the receiver also changes its position and angular orientation. By pivoting the pivot arm, the optical axis remains substantially at the center of the light receiver. At the same time, the light receiver is pivoted so that its light-sensitive surface remains substantially perpendicular to the optical axis of the incoming light beam. This in turn eliminates distortions of the object image on the light receiver. The present invention further permits changing the angle between the optical axis of the received light and the surface of the light receiver in dependence on pivotal motions of the pivot arm so that the light strikes the light receiver at a predefined angle other than a right angle. This is advantageous when it is necessary to generate images of objects which lie in an object plane that is at a predefined, non-perpendicular angle to the optical axis.

In a preferred embodiment of the invention, the light receiver is mounted on a substrate or carrier that has a first end mounted so that it can pivot relative to the housing about a pivot axis, while the movable second end of the carrier is coupled to the pivot arm. This results in a movement of the light receiver along a path which has a fixed relationship to the movement of the pivot arm.

Another preferred embodiment provides a mechanical connector for connecting the pivot arm and the light receiver. A pivotable bearing at one end of the connector couples the latter to the carrier. The other end of the connector is coupled to the pivot arm with another pivoting bearing. By suitably changing the length of the connector and the positioning of the pivoting bearings on the carrier and the pivot arm, respectively, the motion path of the light receiver relative to the pivotal motion of the pivot arm can be changed and fixed.

Since the pivoting bearings coupling the connector to the carrier and the pivot arm require pivotal motions over only limited rotational angles, the pivot bearings can be made in the form of a flat, flexible leaf spring. This provides a well-defined, play-free bearing which is stable over long periods of time and not subject to wear. In addition, such an arrangement permits heat transfers between the carrier and the housing.

In yet another embodiment of the invention, the carrier can at the same time function as a circuit board which mounts the light receiver and electronic elements that may be needed. When the pivot angle for the light receiver is small, the circuit board can perform the function of the leaf spring due to the resilient characteristics of such boards. Alternatively, the carrier can also constitute a plate which has a rigid, non-bendable plate portion attached to a flexible, so-called "flex print" member. The position resolving light receiver and needed electronic components are mounted on the stiff plate portion, while the flexible member includes appropriate conductors for electrical power and for transmitting signals while, at the same time, performing the pivoting function of the leaf spring as was described above. Such an arrangement permits a particularly cost-advantageous production of the pivot mount and the carrier.

A further aspect of the present invention places a contoured surface on the carrier and biases the carrier against an associated contact surface on the pivot arm. The configuration and shape of the contour surface and the contact surface are selected to generate the desired movement path for the light receiver relative to the pivotal motions of the pivot arm. It is of course also possible to arrange the contour surface on the pivot arm and the contact surface on the carrier. The contour surface and/or the contact surface can be formed integrally with the pivot arm and/or the carrier. This is particularly useful when the carrier and/or pivot arm are molded or cast, for example, because the contour and contact surfaces can be formed with the carrier and/or pivot arm, which simplifies production and lowers production costs relative to the embodiment employing a mechanical connector.

A particular advantage of the present invention for the rapid and wear-free distance adjustment is that only one mechanical setting is needed to establish the correct motions for the pivot arm and the carrier including the light receiver. This means that less space is required by the distance adjustment system and that it can be produced at reasonable costs.

DETAILED DESCRIPTION OF THE INVENTION

Figure 1:
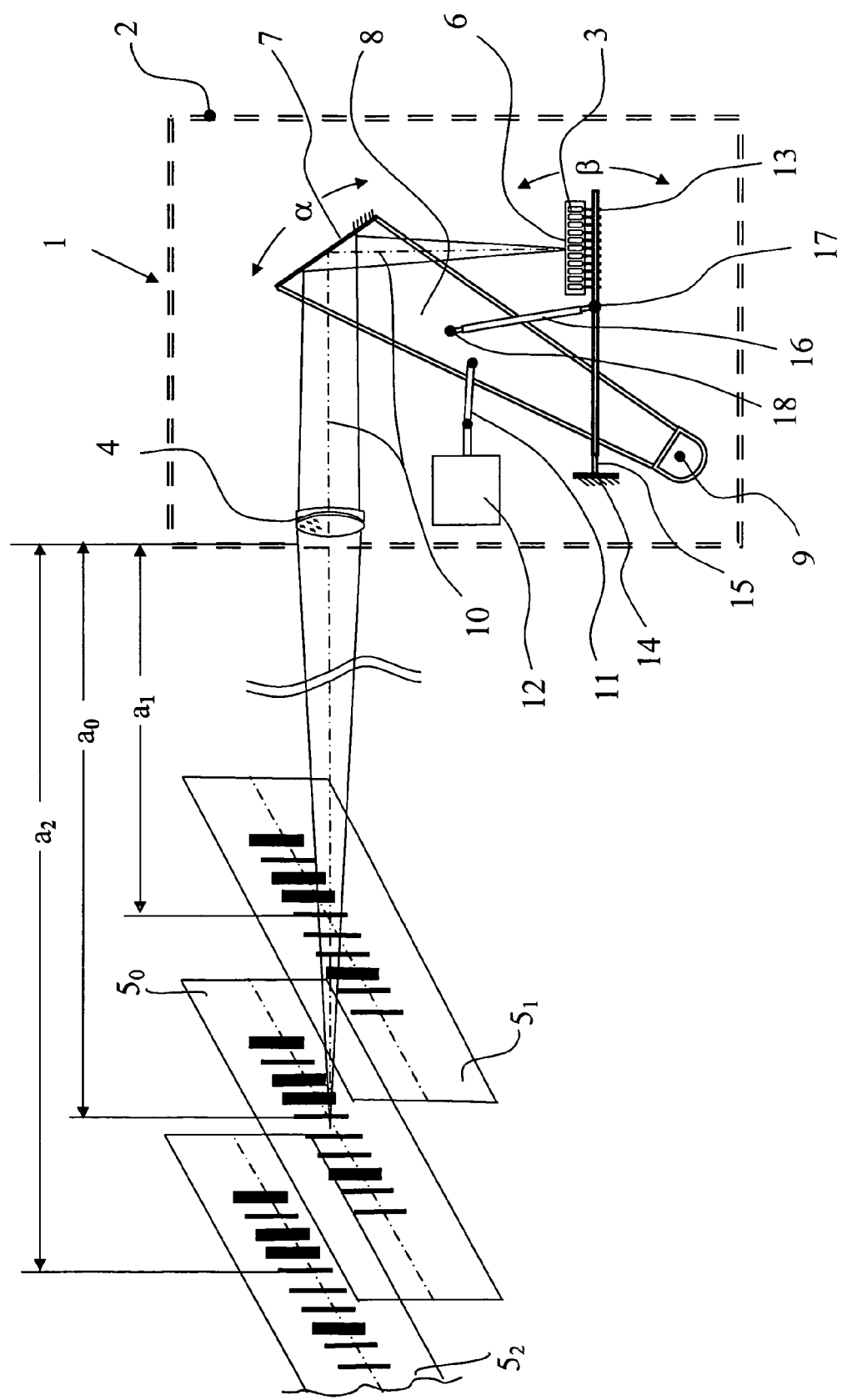
FIG. 1 shows the use of a mechanical connector for coupling the pivot arm to the carrier in accordance with one embodiment of the present invention.

FIG. 1 illustrates the identification system of the present invention in the form of a code reader 1. Code reader 1 includes a housing 2 and a position resolving light receiver 3. For reading one-dimensional codes, the light receiver 3 can be a CCD-line or a CMOS-line. For reading two-dimensional codes, the position resolving light receiver can be a CCD-surface or a CMOS-surface.

A projecting optics, also mounted in housing 2, projects an image of object $5_0$ onto a surface 6 of the light receiver 3.

When needed, an illumination system (not shown in FIG. 1) can be provided for lighting up object $5_0$. Such an illumination system, which may have one or more light sources, can form an integral part of code reader 1 or can be an independent, external lighting unit.

A deflecting mirror 7 is arranged on optical axis 10 between projecting optics 4 and light receiver 3. A pivot arm 8, which carries mirror 7, is attached to housing 2 with a rotational bearing 9. Mirror 7 shown in FIG. 1 is positioned so that incoming light strikes it at an angle of approximately 45°. Mirror 7 deflects the incoming light by approximately 90° towards light receiver 3. The projecting optics direct an image of object $5_0$, which is located at an object distance $a_0$ from the identification system 1, onto surface 6 of light receiver 3 located at the appropriate back focal length downstream of the projecting optics.

When the object distance changes from $a_0$ to $a_1$ or $a_2$, pivot arm 8 must be pivoted about pivot axis 9 through an angle α in order to project an exact image of objects $5_1$ and $5_2$, respectively, onto surface 6 of light receiver 3.

A linear actuator 12 is provided for moving pivot arm 8 in housing 2. A movable push rod 11 connects the actuator to the pivot arm. Actuator 12 pivots pivot arm 8, and therewith mirror 7, about pivot axis 9. The actuator 12 schematically illustrated in FIG. 1 can be any one of a variety of actuators for moving the pivot arm. For example, the actuator can be a circular actuator such as a stepping motor positioned at pivot axis 9. Other actuators, such as magnetic actuators, pneumatic-hydraulic cylinders and the like, can of course be used instead.

As is shown in FIG. 1, light receiver 13 is placed at one side of carrier 13. The other side of the carrier is attached to housing 2 by a bearing 14. For example, as is shown in FIG. 1, the carrier 13 can be attached to the housing with a leaf spring 15 which acts as a bearing permitting pivotal motions of the arm.

In one embodiment of the invention, the carrier 13 is a circuit board on which, in addition to light receiver 1 shown in FIG. 1, other electronic components (not shown) can be mounted. In this arrangement, the function of leaf spring 15 can be supplied by the circuit board itself, or by a flexible member attached to a rigid portion of the circuit board. The flexible member can advantageously be used for supplying needed electrical power and for transmitting signals.

A mechanical connector, such as a connecting rod 16, connects carrier 13 to pivot arm 8. As is shown in FIG. 1, this connection uses two rotational bearings 17 and 18 at the carrier 13 and the pivot arm 8, respectively. Here too, the pivotal connection at both ends of the connector can be a leaf spring which has both ends appropriately fixed to the carrier and the pivot arm. When the distance of the object varies, and the pivot arm is moved, as above described, light receiver 3 moves with the pivot arm along a circular path about bearing 14 which changes the position of light-receiving surface 6 of the light receiver by an angle β. Dependent on the spatial arrangement of bearings 9 and 14, as well as the dimensioning and relative positioning of mechanical connector 16, it is possible to maintain the optical axis substantially perpendicular, or at a predefined other angle, substantially at the center of light receiver 3 for the various positions of mirror 7 that may be encountered.

Figure 2:
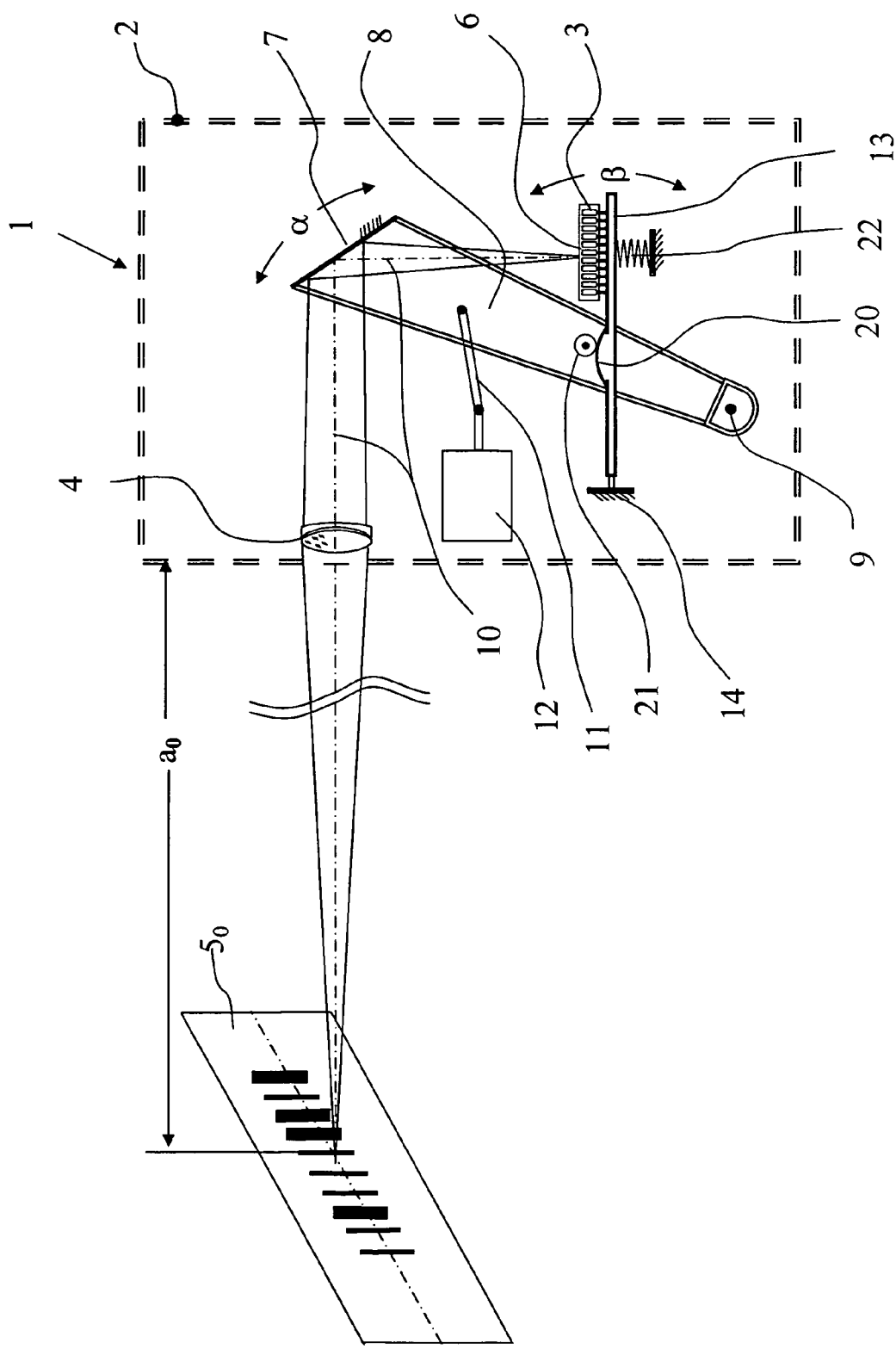
FIG. 2 shows the mechanical connection between the pivot arm and the carrier with a contour surface and an associated contact surface in accordance with another embodiment of the present invention.

Referring to FIG. 2, in another embodiment the coding system couples carrier 13 and pivot arm 8 by arranging a contour surface on carrier 13 which cooperates with a contact surface 21 on pivot arm 8. Contact surface 21 can take a variety of forms; for example, it can be a shaft or a rotatably mounted sleeve. To assure that contour surface 20 always engages contact surface 24 in a play-free manner, a pretensioned compression spring 20 biases the carrier 13 towards the pivot arm. It is of course also possible in accordance with the present invention to arrange the contour surface 20 on pivot arm 8 and the contact surface 20 on the carrier. The motion path of the light receiver relative to the pivotal movements of the pivot arm is determined by the shape of the contour surface 20 and the contact surface 21 as well as their positioning on the pivot arm and the carrier. In this embodiment as well, the motion path of light receiver 3 can be arranged so that its surface is either perpendicular to or at a predefined other angle relative to optical axis 10. This permits making the geometric changes of mirror 7 and light receiver 3 in dependence on the encountered object distance $a_0$ for generating optimal images of the object.

What is claimed is:

1. Apparatus for reading codes by generating images of objects arranged at differing distances comprising a housing, a light receiver arranged in the housing, projection optics for generating images of the objects, a deflecting mirror arranged between the light receiver and the projection optics along an optical axis of the projection optics, a pivot arm in the housing pivotable about a pivot axis for changing the back focal length by pivotally moving the pivot arm, and a connector between the light receiver and the pivot arm for moving a light-receiving surface of the light receiver so that the light-receiving surface changes its relative position and angular orientation when the pivot arm moves.

2. Apparatus for reading codes according to claim 1 including a carrier mounting the light receiver, a first end of the carrier being pivotally attached to the housing, and a second end of the carrier being connected to the pivot arm.

3. Apparatus for reading codes according to claim 2 wherein a connection between the pivot arm and the carrier comprises a mechanical coupler.

4. Apparatus for reading codes according to claim 3 including first and second rotational bearings forming the connection between the carrier and the pivot arm.

5. Apparatus for reading codes according to claim 4 wherein at least one of the first and second rotational bearings is defined by a leaf spring which connects the mechanical coupler to at least one of the carrier and the pivot arm.

6. Apparatus for reading codes according to claim 2 including a contour surface and a contact surface arranged on respective ones of the carrier and the pivot arm, and a member biasing the carrier towards the pivot arm to maintain play-free contact between the contour surface and the contact surface.

7. Apparatus for reading codes according to claim 2 wherein the carrier comprises a circuit board mounting the light receiver, and wherein a portion of the circuit board acts as the flexible leaf spring that pivotally mounts the circuit board in the housing.

8. Apparatus for reading codes according to claim 2 wherein the carrier comprises a plate having a substantially rigid plate portion, wherein the light receiver is mounted on the rigid plate portion, and wherein the plate comprises a second, flexible member performing the function of the leaf spring and including means for providing electrical power and transmitting signals.

9. Apparatus for reading codes according to claim 1 including a connector between the carrier and the pivot arm configured and spatially arranged so that the light-receiving surface of the light receiver remains substantially perpendicular to the optical axis when the pivot arm moves.

10. Apparatus for reading codes according to claim 1 including a connector between the carrier and the pivot arm configured and spatially arranged so that the light-receiving surface of the light receiver remains at a predetermined, substantially constant non-perpendicular angle relative to the optical axis when the pivot arm moves.

11. Apparatus for reading codes according to claim 1 including a connector between the pivot arm and the carrier configured and arranged so that the optical axis of the received light strikes the light-receiving surface of the light receiver at about a center of the light-receiving surface at all times.

12. Apparatus for reading codes according to claim 1 wherein the mirror has one of a light converging and a light diverging optical effect.

13. Apparatus for reading codes according to claim 1 wherein the mirror is arranged within the projection optics.

14. Apparatus for reading codes according to claim 1 wherein the pivot axis for the pivot arm comprises at least one flexible leaf spring which has first and second ends connected to the housing and the pivot arm.

15. Apparatus for reading codes according to claim 1 including one of a linear actuator and a circular actuator for moving the pivot arm and the carrier.

* * * * *